United States Patent [19]

Kolesinski

[11] Patent Number: 5,158,682
[45] Date of Patent: Oct. 27, 1992

[54] SEPARATION MEDIA CONTAINING ACYL DIAZEPINES

[75] Inventor: Henry S. Kolesinski, Beverly, Mass.

[73] Assignee: PolySep Surface Technologies Inc., Acton, Mass.

[21] Appl. No.: 887,083

[22] Filed: May 22, 1992

Related U.S. Application Data

[62] Division of Ser. No. 497,787, Mar. 21, 1990, which is a division of Ser. No. 337,342, Apr. 13, 1989, abandoned.

[51] Int. Cl.⁵ .............................................. B01D 15/08
[52] U.S. Cl. .................................... 210/635; 210/656; 210/198.2; 210/502.1; 55/67; 55/386
[58] Field of Search .................... 210/635, 656, 198.2, 210/502.1; 55/67, 386; 436/161, 162; 422/70

[56] References Cited

U.S. PATENT DOCUMENTS

| | | | |
|---|---|---|---|
| 4,617,253 | 10/1986 | Taylor | 430/323 |
| 4,670,528 | 6/1987 | Taylor | 526/263 |
| 4,879,038 | 11/1989 | Namikoshi | 210/635 |

*Primary Examiner*—Ernest G. Therkorn
*Attorney, Agent, or Firm*—Schiller & Kusmer

[57] ABSTRACT

Method of chromatographically separating a mixture by contacting said mixture under chromatographic separation conditions with a chromatographic separation stationary phase comprising an N-acyl diazepine polymer. In a preferred form, the polymer has been rendered substantially alkali-stable by substitution for the hydrogen at the C3 position on the diazepine ring.

17 Claims, 1 Drawing Sheet

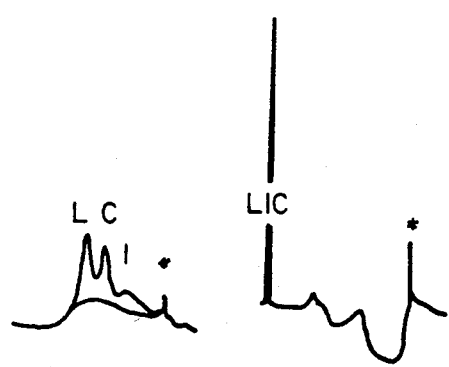 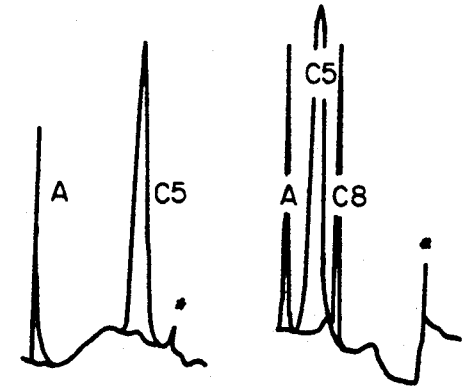
Fig. 1A  Fig. 2A  Fig. 3A  Fig. 4A
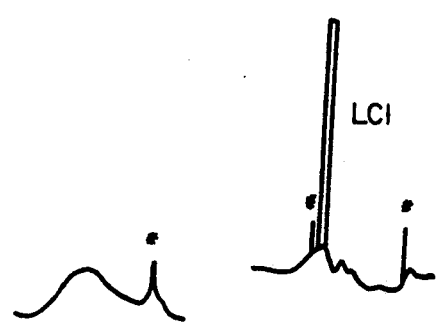 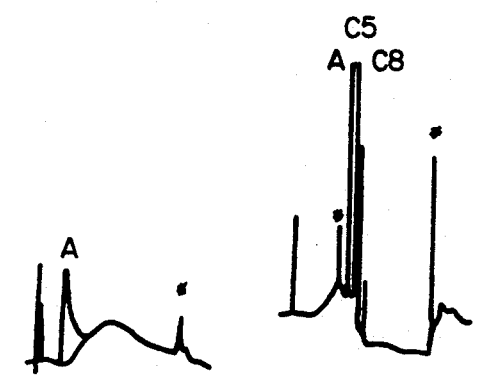
Fig. 1B  Fig. 2B  Fig. 3B  Fig. 4B
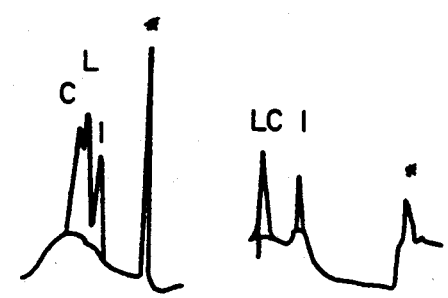 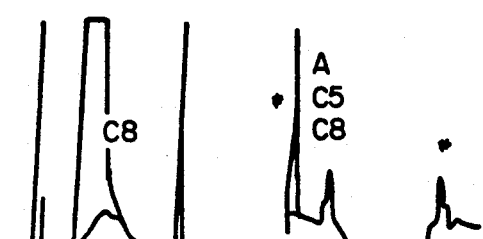
Fig. 1C  Fig. 2C  Fig. 3C  Fig. 4C

SEPARATION MEDIA CONTAINING ACYL DIAZEPINES

This application is a divisional application of allowed application Ser. No. 07/497,787, filed Mar. 21, 1990, which is a division of application Ser. No. 07/337,342 filed Apr. 13, 1989, now abandoned.

This invention relates to chromatographic stationary phases containing acyl diazepines and a method of using same to effect chromatographic separations.

The separation of materials by techniques known as chromatography are well known. Inasmuch as liquid chromatography provides generally better separations than gas chromatography and separates a much wider range of materials (e.g. proteins), the discussion hereinafter will be primarily directed to liquid chromatography, but it is to be understood that the principles of the present invention may, in many instances, be applied to gas chromatography as well.

It has long been known that the stationary phases for liquid chromatography require certain chemical and physical properties. For example, where a bonded phase is disposed on support material, the latter typically may be formed of small spheres or irregular particles of strength sufficient to resist crushing in the process of packing same into a column, and possess desired pore diameters, pore volume and pore volume distribution. Such support material should be chemically pure and surface groups should be distributed substantially homogeneously. The bonded phase or coating is typically immobilized on the support so as not to adversely alter the kinetics of the support or the chromatographic stability. The immobilized layer should be relatively chemically and physically stable, mass transfer should not be restricted within the layer and the synthesis of the layer should be convenient and highly reproducible.

Supports have been typically made of irregular or spherical beads of silica, glass, organic polymers and the like, generally about 5 to 70 um in diameter, formed into pellicles with a thin layer of bonded phase that may be a rigid solid, or hard or soft gel. Alternatively, a glass bead can be coated with a porous layer of silica to which the bonded phase is then applied. The stationary phase may also be formed simply as a homogeneous bead, e.g. from an ion-exchange polymer, or as a membrane, fiber or the like. Such prior art stationary phases may, for example and depending upon the functionality desired, contain diol, ether, amino, amide, C18, C8, C2, phenyl, cyclohexyl groups and the like.

Where the support is siliceous, the coating is usually bound to the substrate usually through reaction with surface silanol groups, but can be attached through other mechanisms. For example, polyvinyl-pyrrolidones, polybutadienes and polyethyleneimine have been immobilized on silica substrates, through thermal treatment, gamma-radiation, peroxide initiated polymerization, or chemical cross-linking. The use of silica supports is widespread for their low cost, the high column efficiency achieved, the good mechanical stability achieved under high pressure, and the ready availablity of a wide range of particle sizes and porosities. Silica as a substrate is, however, limited in the number of ligands that can be attached. Further, the stationary phase often does not or cannot cover or shield all of the silanol groups on a siliceous substrate. In such case, reactions can occur between those groups and, for example, proteins, amines and the like when attempting to separate solutions containing the latter, resulting in undesirable peak-tailing, high levels of non-specific binding and poor recovery of these materials. Where the surface of the support, whether silica or other material, is completely covered, as by coating polybutadiene onto a surface and cross-linking it through a peroxide reaction, the result is a commercialy available, selective surface. However, the use of such surfaces, particularly in reverse phase mode separation, tends to bind proteins too strongly, necessitating the use of strong organic solvents for elution. Such solvents may cause undesirable denaturing of the protein.

A number of other substrate materials, such as alumina, magnesia, titania, zirconia and the like have also been used as supports in stationary chromatographic phases, but the practicality of such alternative inorganic support materials depends rather heavily upon the ability to couple functional organic stationary phases to their surfaces. Organic polymers have been immobilized on such alternative inorganic supports by cross-linking rather than by covalent bonding to the surface. Such cross-linking has generally been achieved by reaction with radical starters such as peroxides, or by hard irradiation such as gamma rays and electron beams.

Conventional liquid chromatography with bonded packings are generally either polar or nonpolar. Few cases are known where reverse phase type packings are mixed, and generally there have been few efforts to provide packings with a range of polarity. Historically, it has been easier to change eluents in order to vary selectivity or retention. The economic advantages achieved by tailoring packings instead of the eluent have been largely overlooked.

Reverse phase packings for proteins are generally proprietary products usually with a polymer-type bonding strongly masking surface silanols where silica is the substrate. Retention is by sorption on the hydrophobic portion of a protein molecule on hydrophobic ligands (such as C2) on the packing surface. Elution is by gradient from weak eluent (aqueous buffers) to organic eluents such as isopropanol or acetonitrile. Often the high organic eluent levels used to elute the proteins will denature the latter. Less hydrophobic groups require a lower organic level for elution and reduce the possibility of denaturing the proteins.

Hydrophobic interaction chromatography packings for proteins are also generally proprietary products, usually with a polymer-type hydrophilic bonding such as a polyether that sorbs water and does not, therefore, tend to sorb proteins. Hydrophobic interaction chromatography uses gradients from high to low salt concentrations and the more hydrophobic proteins are, therefore, retained longer. This method is considered more gentle generally than reverse phase chromatography because more proteins retain their activity. However, specific proteins that will not readily denature in organic eluents may denature in the salt solutions.

The present invention, therefore, has as its principal object, provision of a novel chromatographic stationary phase and a method of effecting chromatographic separations using such a stationary phase. Yet other objects of the present invention are to provide such chromatographic stationary phases that can be bound to a substrate material without covalent bonding, and to provide a method of making a chromatographic column packing with such stationary phases.

The present invention overcomes a number of the problems of the prior art by providing a chromatographic separation surface formed by photolytic rearrangement of copolymers containing a pyridinium ylide as a functional component. Particularly, the foregoing and other objects of the present invention are achieved by using N-acyl diazepine polymers, which have now been found unexpectedly to exhibit substantial activity as excellent stationary phase chromatographic separation surfaces both in reverse phase mode and in a hydrophobic interaction mode. The photolytic reaction that rearranges such polymers preferably and advantageously, for purposes of the present invention, also is known to yield, particularly when triplet sensitized, small amounts of side-reaction products, such as isocyanates or nitrenes. These latter are particularly useful in promoting cross-linking of the polymer which can, therefore, find chromatographic use as functional coatings, membranes and fibers. Thus, the polymer may be coated onto substrates by formation of the polymer in situ about the substrate from the monomers, or can be coated in polymeric form by deposition from a solution in a suitable solvent. In either case, the coating is thereafter immobilized by exposure to soft actinic radiation such as ultraviolet.

The photolytic rearrangement and cross-linking events described are particularly useful as a universal immobilization process whereby comonomers conferring different functionalities such as ion-exchange, chiral, affinity and the like, may be copolymerized with pyridinium ylide monomers. The resulting copolymers are then coated and immobilized on a substrate of choice by exposure to actinic radiation, thereby providing various purification and separation modalities.

Because the coating and immobilization of the polymers of the present invention onto substrates can be achieved without involving silane chemistry, a wide variety of substrates can be employed, particularly those that, unlike silica, are alkali-stable.

Other objects of the present invention will in part appear obvious and will in part appear hereinafter. The invention accordingly comprises the product possessing the features, properties and relation of components, and the method involving the several steps and the relation and order of one or more of such steps with respect to each of the others, all of which are exemplified in the following detailed disclosure and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein:

FIG. 1 is a group of chromatograms on a common time axis, respectively showing the separation of identical samples of relatively large protein molecules in three different chromatographic columns all operated in a hydrophobic interaction mode; FIG. 1A being obtained from a column formed and operated in accordance with a procedure employing the principles of the present invention, FIG. 1B being obtained from operation of a commercially available standard reverse phase mode column of E. I. duPont de Nemours Co., and FIG. 1C being obtained from operation of a commercially available standard hydrophobic interaction column of The Nest Group;

FIG. 2, including FIGS. 2A, 2B and 2C, is another group of chromatograms on a common time axis, respectively showing the separation of identical samples of the same relatively large protein molecules in the three different chromatographic columns identified in connection with FIG. 1, all, however, being operated in a reverse phase mode;

FIG. 3 is another group of chromatograms on a common time axis, respectively showing the separation of identical samples of relatively small phenone molecules in the three different chromatographic columns identified in connection with FIG. 1, all again being operated in a hydrophobic interaction mode, the respective chromatograms being identified as 3A, 3B and 3C; and FIG. 4 is a final group of chromatograms on a common time axis, the chromatograms being identified as 4A, 4B and 4C respectively showing the separation of samples of the same phenones, as employed in connection with FIG. 3, in the three different chromatographic columns identified in connection with FIG. 1, all being operated in a reverse phase mode.

DESCRIPTION OF THE PREFERRED EMBODIMENTS

The photolysis of aminimides derived from pyridines and the production of diazepines therefrom was known as early as 1973. *Chem. Rev.*, Vol. 73, No. 3, pp. 272-273. It is also known that products including a hydrophobic or relatively water-insoluble polymer can be prepared by subjecting a water-soluble polymeric pyridinium ylide, such as N-1 pyrindinio amidate, to a source of actinic radiation sufficiently strong to induce a chemical modification thereof. Particularly, U.S. Pat. No. 4,617,253 discloses the use of that particular radiation-induced reaction in the preparation of photosensitive materials such as photoresists, and water-repellant materials such as sheets, mats, ropes and the like. The polymeric pyridinium ylide polymers disclosed in that patent and used in the present invention are those which include pyridinium ylide moieties of the formulas:

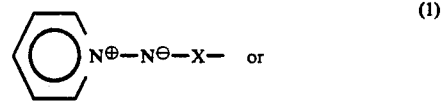

(1)

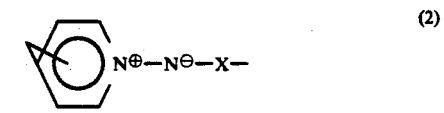

(2)

R being an alkyl, aryl, alkaryl or aralkyl group preferably with some degree of polymerizable unsaturation.

These polymers, upon exposure to actinic radiation of sufficient intensity, typically centered at a wavelength of about 350 nm, convert to N-acyl diazepines as follows:

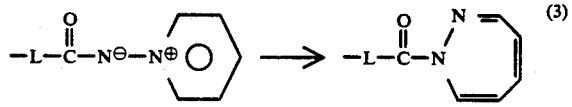

(3)

where L is a linking portion of the polymer chain.

U.S. Pat. No. 4,670,528, the disclosure of which is incorporated herein by reference, further teaches that the pyridinium ylide polymers disclosed therein can be copolymers containing units provided by copolymerization with various ethylenically unsaturated comonomers that can provide the resulting copolymers with certain desirable properties such as controllable coatability, viscosity, polymerizability and photoreactivity. Such ethylenically unsaturated monomers are typically copolymerized with the pyridinium ylide monomers using free radical initiation.

One of the preferred pyridinium ylide monomers used in the present invention is prepared by the process taught in Example I of U.S. Pat. No. 4,617,253 to provide a white, water-soluble, crystalline solid identified as pyridinium 1-[[[[2-[(2-methyl-1-oxo-2-propenyl)-oxy] ethyl]amino]carbonyl]amino]-hydroxide, inner salt, having the formula:

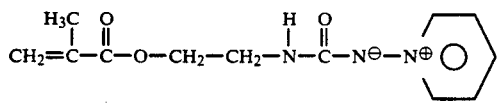
(4)

Yet another preferred pyridinium ylide monomer useful in the present invention has the general formula:

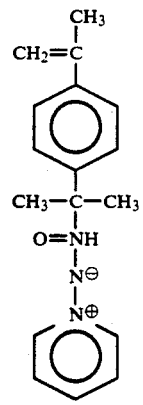
(5)

In the process of producing the chromatographic surfaces of the present invention, a layer or coat of polymeric pyridinium ylide is converted by actinic radiation to a polymeric N-acyl diazepine by ring expansion as heretofore described. The photoconversion drastically alters the physical properties of the layer, particularly its solubility and hydrophobicity. For example, the pyridinium ylide is normally quite soluble in water so the layer can be readily formed from a water solution. Upon irradiation, however, the resulting diazepine polymer is characterized particularly by its insolubility in water and, it has now been found to provide a surface that can readily be functionalized for use in chromatographic separations.

The chromatographic characteristics of the polymers and copolymers used in the present invention can be tailored with a high degree of specificity. For example, a preferred copolymer may be formed by copolymerization with monomeric moieties of the general formula:

(6)

where $R_6$ is alkyl, aryl, alkaryl or aralkyl, and $R_5$ is alkylene. A particularly useful example of such a monomer is the ethanol adduct of iso cyanatoethylmethacrylate which, when copolymerized with a pyridinium ylide monomer will provide the following:

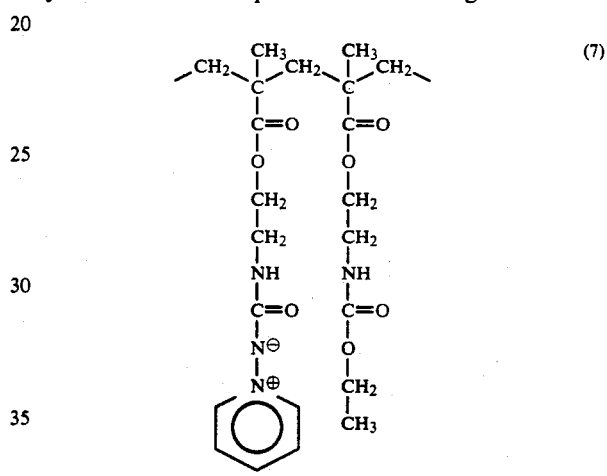
(7)

After photoconversion, the polymer of formula (7) unexpectedly can be used both as a reverse phase mode stationary phase and as a hydrophobic interaction stationary phase. One can confer increased hydrophobicity on the polymer by substituting, using known techniques, larger alkyl, aryl, alkaryl or aralkyl groups for the terminal methyl or ethyl group in the methacrylate moiety provided by a comonomer such as formula (6), increasing the polymer's utility as a reverse phase as well as a hydrophobic interactive chromatographic surface. The copolymer also can be made more hydrophilic, for example, by inclusion of other comonomers such as vinyl pyrrolidone, acrylamide and the like. Similarly, changes in the relative ratios of the pyridinium ylide and its comonomer moiety in the copolymer will accordingly alter its relative hydrophobicity or hydrophilicity for separation or purification purposes.

Of particular interest, from the standpoint of chromatography, is that the H located at the C-3 position on the diazepine ring of the polymers of the present invention is attacked by alkalis with attendant ring opening. The substitution of an alkyl group such as methyl at the C-3 position on the diazepine ring, however, prevent such ring opening and the resulting polymer tends to be alkali stable. Recognition that such substitution can alleviate the alkali instability of diazepine rings has been disclosed by Streith, Luttringer and Nastasi in *J. Org. Chem.* p. 2964, Vol. 36, No. 20, 1971. In the context of the present invention, such substitution permits one to use the resulting polymer for protein separations and subsequently use alkali with relative impunity to depyrogenate the chromatographic column.

For example, if one substitutes the pyridinium ylide monomer of formula (4) at the C-2 position with an alkyl, aryl, alkaryl or aralkyl group, one obtains an alkali-stable, substituted diazepine of the present invention, comprising a plurality of repeating units having the formula:

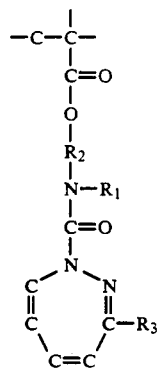
(8)

where $R_1$ is a hydrogen, alkyl, aryl, alkaryl or aralkyl, $R_2$ is a divalent alkylene radical, and $R_3$ is the alkyl, aryl, alkaryl or aralkyl group. In a preferred compound of the type noted in formula (8), R is hydrogen, $R_2$ is 1,2 ethylene, and $R_3$ is methyl.

It is also known that substituting electron-donating groups at the C-4 position of N-imides leads to the expected 1,2 diazepines upon irradiation, while substituting electron-withdrawing functions totally inhibits the photoinduced ring expansion. Alkyl, methoxy and cyano subsitutents at the C-2 position orient the primary photochemical process exclusively toward C-6, resulting in 3-substituted 1,2 diazepines. Substituting weak electron-donating groups at the C-3 position, such as methyl, halogens and the like results in both 4- and 6-substituted diazepines; electron-withdrawing groups such as CN, $CO_2Et$, $CONH_2$, promote high yield regiospecific ring expansion to 4-substituted diazepines. Cf. Snieckus et al, *1,2, Diazepines: a New Vista in Heterocyclic Chemistry*. Acc. Chem. Res., 1981, 14, 348-355.

It should also be noted that the diazepine ring can be substituted, for example at the C-3 position, with any of a number of different ligands as the effective group so as to thereby provide stationary phases for separation, for example, by ion-exchange, or by affinity and the like. Of course, judicious selection of comonomers and/or substitution of the terminal methyl or ethyl group of the comonomer can also be used to confer ion-exchange, affinity or other functionality for separation as earlier noted.

To provide a weak ion exchange functionality to the polymer of the present invention, one can copolymerize pyridinium ylide monomers with any of a large number of known monomers such as acrylic acid, methacrylic acid, amino ethyl methacrylate hydrochloride, aminopropyl acrylamide hydrochloride and the like. Other monomers, such as the sodium salt of acrylamido-2-methylpropane sulfonic acid, when coplymerized with the pyridinium ylide monomer will confer a strong cation exchange capability on the resulting copolymer. Yet other comonomers, such as diethylaminoethylmethacrylate, that will provide a weak anion exchanger capability, can be converted to strong anion exchangers when quaternized in known manner.

The polymers of the present invention may also be provided with an affinity functionality, for example by copolymerizing the pyridinium ylide monomer with comonomers such as 4-vinyl benzyl, chloroethylsulfone, 2-vinyl-4,4-dimethyl oxazalone and the like. The copolymer provided by the latter monomer will provide an affinity matrix that, after polymerization and photorearrangement will particularly react with a ligand containing amino or hydroxyl groups.

The stationary phase material of the present invention may be used in powdered or beaded form with or without additional support material and packed into a column, or may be used to coat a capillary column, or may be formed into a separation membrane or fibers. In one form, the stationary phase material of the present invention is supported on a carrier or support substrate to improve the resistance to crushing and to limit dimensional changes due to solvent exchange. The shape and size of the support elements is a matter of choice, but a preferred form of the support is as minute porous or imporous particles or beads of substantially uniform size typically in the range of between about 1 to 300 um in diameter, and, if porous, having an average pore diameter in the range of between about 50 to 50,000 A. The support can be either organic or inorganic although the latter is preferred. Suitable inorganic supports are silica, alumina, magnesia, titania, zirconia and the like. Appropriate organic supports can be any of a number of high molecular weight polymers such as polystyrene, polyacrylates and the like.

When used in thin layer chromatography, the stationary phase of the present invention is preferably formed as particles of between about 0.1 um to 0.1 mm on a supporting plate in a layer of about 0.1 to 100 mm thick.

GENERAL CONDITIONS

In the following examples, the monomer containing the pyridinium ylide moiety was prepared by the process taught in Example I of U.S. Pat. No. 4,617,253, and has the formula described in (4) above. Where such monomer was polymerized, photorearranged and immobilized to form part of a chromatographic separation system, in each instance, detection of the eluent components was effected with an HPLC system comprising a Gilson gradient system with a pair of Rainin (Gilson) Rabbit HP pumps, a Gilson LC System Manager (Mod. 704, version 2.1) controller module, and a Waters 441 ultraviolet spectrophotometric detector operated at a wavelength of 254 nm. A Gilson Model 213 robotic autosampler with a 25 ul loop was used for sample injection. Eluant gradients were always run from 5% B in A to 95% B in A in 10 minutes at a flow rate of 2 ml/min after an initial isocratic delay of 5 minutes following injection.

Three different types of columns were used, one being a column prepared in accordance with Example I following, the other two being respectively a DuPont Protein Plus RP Column (25×0.46 cm., dp=6 um) obtained from E.I. duPont de Nemours Co., Delaware (hereinfter identified for the sake of brevity as the duPont column), characteristic of a standard reverse phase column, and a Polypropyl-Aspartamide HIC Column (5×0.46 cm, dp=5 um) obtained from The Nest Group, Southbridge, Mass. (hereinafter identified as the Nest column), characteristic of a standard hydrophobic interaction column.

All chromatograms were run in triplicate, each sample run being followed with a control (no sample) run. Chart speed was 3 cm/min. The various peaks in chromatograms in FIGS. 1 and 2 indicated by the letters L, C and I respectively identify the presence of lysozome, alpha-chymotrypsingen-A, and insulin as hereinafter described. The various peaks in chromatograms in FIGS. 3 and 4 indicated by the letters A, C5 and C8 respectively identify the presence of acetone, pentylphenone and octylphenone as will be hereinafter described. Those peaks identified with an asterisk are "dirt" artifacts also found in the control runs.

EXAMPLE I

In a polymerization reactor, 3.36 gms of the monomer of formula (4) was mixed with 2.67 gms of isocyanatoethylmethacrylate provided as an ethanol adduct in 70 mls of 1:1 mixture of methanol and water, together with 93 mgs of azo-bis-4-cyano-pentanoic acid as a polymerization initiator. A sequence of freezing and vacuum steps was applied to the mixture to remove oxygen and the reactor was sealed under vacuum. The tube was maintained overnight at a temperature of from 64° C. to 70° C. to permit the formation of the copolymer. Solvent was evaporated from the polymerization product, and the residue dissolved in 10 mls of trichlormethane. The copolymer, previously characterized by formula (7), was precipitated from the trichlormethane solution into about a half liter of tetrahydrofuran, the precipitate collected and dried under vacuum at about 45° C. for three hours.

Two gms of the copolymer was then dissolved in 50 mls of water and added to 10 gms of silica particles averaging 35–70 um in diameter with about 500 A pores. The mixture was agitated for 10 minutes in a rotary evaporator. The solvent was then vacuum stripped at 25 in. at a bath temperature of 80° C. to form a copolymer layer, calculated to be about 13 A thick, around the silica particle surfaces. After stripping, the material, a free-flowing powder, was exposed to an actinic dose of UV radiation (ca. 350 nm) from a mercury arc lamp to photorearrange and crosslink the coating, converting the polymeric pyridinium aminimide to the corresponding N-acyl-diazepine. The resulting powder was then packed under pressure into a stainless steel microtube (30 cm×3.9 mm ID) to form a chromatographic separation column.

EXAMPLE II

A 25 ul protein sample to be separated was prepared as a mixture of lysozome, chicken egg (3 mg/ml, L6876, Sigma), alpha-chymotrypsingen-A, bovine pancreas Type II (3 mg/ml, C4879, Sigma), insulin, bovine pancreas (3 mg/ml, I5500, Sigma) and albumin, bovine, fraction V (3 mg/ml, #5161, Nutritional Biochemical) sonified to dissolve in water with 0.1% trifluoracetic acid and passed through a 0.45 micron Millipore cellulose acetate filter just before use. The sample was introduced into the top of a column prepared according to Example I. The sample was eluted with a gradient of eluent as described above, A being 0.1M $K_2HPO_4$ and 1.8M $(NH_4)_2SO_4$; B being 0.1M $K_2HPO_4$. Both mobile phases were titrated to an apparent pH of 7 with diluted $H_3PO_4$ (1:9 water). The column effluent was passed into a detector and the resulting chromatogram of the column of the present invention operated in a hydrophobic interaction mode is shown at FIG. 1A.

EXAMPLE III

A 25 ul protein sample to be separated was prepared according to Example II and introduced into a duPont column operated in a hydrophobic interaction mode by introducing the same eluent as used in Example II. The chromatogram obtained by passing the column effluent through the detector is shown at FIG. 1B.

EXAMPLE IV

A 25 ul protein sample to be separated was prepared according to Example II and introduced into a Nest column operated in a hydrophobic interation mode by introducing the same eluent as used in Example II. The chromatogram obtained by passing the column effluent through the detector is shown at FIG. 1C.

EXAMPLE V

Another protein sample, prepared according to Example II, was injected into a column of the present invention prepared as described in Example I. The column was operated in a reverse phase mode by eluting the sample with a gradient of eluent in which, A was 0.1% V/V trifluoroacetic acid and water; B being LC grade acetonitrile. The column effluent was passed into a detector; the resulting chromatogram of the column of the present invention operated in a reverse phase mode is shown at FIG. 2A. As is apparent from FIG. 2A, all of the proteins eluted together.

EXAMPLE VI

A sample identical to that injected into the column of Example V was separated in the duPont column operated in a reverse phase mode by introducing the same eluent as use in Example V. The chromatogram obtained by passing the column effluent through the detector is shown at FIG. 2B, and clearly indicates the separation of the proteins by reverse phase mode operation.

EXAMPLE VII

Another sample to be separated was prepared according to Example II and introduced into a Nest column operated in a reverse phase mode by introducing the same eluent as used in Example V. The chromatogram obtained by passing the column effluent through the detector is shown at FIG. 2C.

EXAMPLE VIII

To determine how a column prepared according to Example I would function in a hydrophobic interation mode with relatively small molecules, a 25 ul sample solution of pentylphenone (1.2 ul/ml) and octylphenone (1.2 ul/ml) made up in 50% V/V acetonitrile in water, together with acetone (60 ul/ml) as a marker, was injected into a column prepared according to the principles of the present invention. Following sample injection, the column was eluted as described with the same mobile phase that was used in Example II. The resulting chromatogram, shown at FIG. 3A indicates that the copolymer of Example I exhibited excellent chromatographic reverse phase mode characteristics.

EXAMPLE IX

A sample identical to that injected into the column of Example VIII was separated in the duPont column operated in a hydrophobic interaction mode by introducing the same eluent as use in Example VIII. The chromatogram obtained by passing the column effluent through the detector is shown at FIG. 3B, and clearly indicates the column does not operate well in this mode.

EXAMPLE X

Another sample to be separated was prepared according to Example VIII and introduced into a Nest column operated in a hydrophobic interation mode by introducing the same eluent as used in Example VIII. The chromatogram obtained by passing the column effluent through the detector is shown at FIG. 3C.

EXAMPLE XI

Another phenone sample, prepared according to Example VIII, was injected into a column of the present invention prepared as described in Example I. The column was operated in a reverse phase mode by eluting the sample with a gradient of eluent in which, A was 0.1% V/V trifluoroacetic acid and water; B being LC grade acetonitrile. The column effluent was passed into a detector; the resulting chromatogram of the column of the present invention is shown at FIG. 4A.

EXAMPLE XII

A 25 ul phenone sample to be separated was prepared according to Example VIII and introduced into a duPont column operated in a reverse phase mode by introducing the same eluent as use in Example XI. The chromatogram obtained by passing the column effluent through the detector is shown at FIG. 4B.

EXAMPLE XIII

A 25 ul phenone sample to be separated was prepared according to Example VIII and introduced into a Nest column operated in a reverse phase mode by introducing the same eluent as use in Example XI. The chromatogram obtained by passing the column effluent through the detector is shown at FIG. 4C.

It should be noted that generally, for hydrophobic interaction chromatography, one would want a relatively hydrophilic stationary phase surface to which protein, for example, sorbs poorly. On the other hand, for reverse phase chromatography employing an aqueous-organic (polar mobile) phase, the stationary phase surface is preferably relatively hydrophobic and protein will adhere well to the latter. The surface provided by the polymers of the present invention exhibit, as shown in the Examples, somewhat anomalous behavior in acting as both a hydrophobic interaction surface and a reverse phase surface depending upon the nature of the material being separated and the eluent employed. The column of the present invention shows good separation of proteins in the hydrophobic interaction mode, indicating that it is acting as a hydrophobic interaction column. Note that the order of protein elution differs from that shown by the Nest column. In the reverse phase mode, the column of the present invention lets all three proteins pas through simultaneously. As with the Nest column, the column of the present invention retains the small phenone molecules in the hydrophobic interaction mode, but the retention is greater than in the Nest column, indicating a more hydrophobic packing. Particularly, when employed in the reverse phase mode, the polymers of the present invention separate relatively small molecules such as C5 and C8 phenones that were not retained by the Nest column.

Thus, the polymers of the present invention find particular utility in effecting separation, for example, of drugs in blood, because the drugs would tend to be separated by the reverse phase chromatography while the large proteins will elute without separation.

A charge of polymeric pyridinium ylide of the present invention, dissolved in a suitable solvent, can be introduced into a capillary tube transparent to actinic UV, the solvent removed while rotating the tube about its long axis, and the tube exposed to the radiation. In such case, it will be appreciated that the pyridinium ylide will photoconvert to the desired N-acyl diazepine in a uniform layer about the inside of the tube, thereby conveniently forming a capillary chromatographic column.

Since certain changes may be made in the above product and methods without departing from the scope of the invention involved, it is intended that all matter contained in the above description or shown in the accompanying drawings shall be interpreted in an illustrative and not in a limiting sense.

What is claimed is:

1. Method of chromatographically separating a mixture, said method comprising the step of:
   contacting said mixture under chromatographic separation conditions with a chromatographic separation stationary phase comprising an N-acyl diazepine polymer.

2. Method as defined in claim 1 wherein said conditions are liquid chromatographic separation conditions.

3. Method as defined in claim 2 wherein said eluent is a gradient of an aqueous salt solution, and said separating is in a hydrophobic interaction mode.

4. Method as defined in claim 2 wherein said eluent is a gradient of a liquid organic mixture, and said separating is in a reverse phase mode.

5. Method as defined in claim 4 wherein said mixture is of water and an organic liquid.

6. Method as defined in claim 1 including the steps of eluting said mixture from said stationary phase with an eluent.

7. Method as defined in claim 1 wherein said polymer comprises a polymeric backbone having pendant therefrom or as part of said backbone, an acyl diazepine moiety of the general formula:

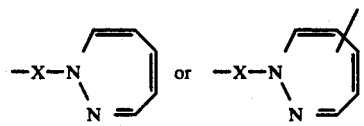

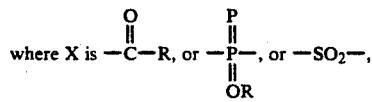

and R is alkyl, aryl, alkaryl or aralkyl with some degree of polymerizable unsaturation.

8. Method as defined in claim 1 wherein said polymer comprises a polymeric backbone having pendant therefrom or as part of said backbone, an acyl diazepine moiety of the general formula:

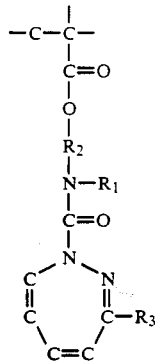

where $R_1$ is a hydrogen, alkyl, aryl, alkaryl or aralkyl, $R_2$ is a divalent alkylene radical, and $R_3$ is hydrogen, an alkyl, aryl, alkaryl or aralkyl group.

9. Method as defined in claim 8 wherein $R_1$ is hydrogen, $R_2$ is 1,2 ethylene, and $R_3$ is methyl.

10. Method as defined in claim 1 wherein said separation material is a copolymer of said N-acyl diazepine and a copolymeric moiety.

11. Method as defined in claim 10 wherein said copolymeric moiety has a chromatographic functionality.

12. Method as defined in claim 11 wherein said functionality is ion exchange.

13. Method as defined in claim 11 wherein said functionality is affinity binding.

14. Method as defined in claim 11 wherein said functionality is hydrophobic interaction.

15. Method as defined in claim 11 wherein said functionality is reverse phase binding.

16. Method as defined in claim 10 wherein said copolymeric moiety is derived from an alcohol adduct of isocyanatoethylmethacrylate.

17. Method as defined in claim 10 wherein said copolymeric moiety is of the general formula:

where $R_6$ is alkyl, aryl, alkaryl or aralkyl, and $R_5$ is alkylene.

* * * * *